United States Patent Office 3,591,345
Patented July 6, 1971

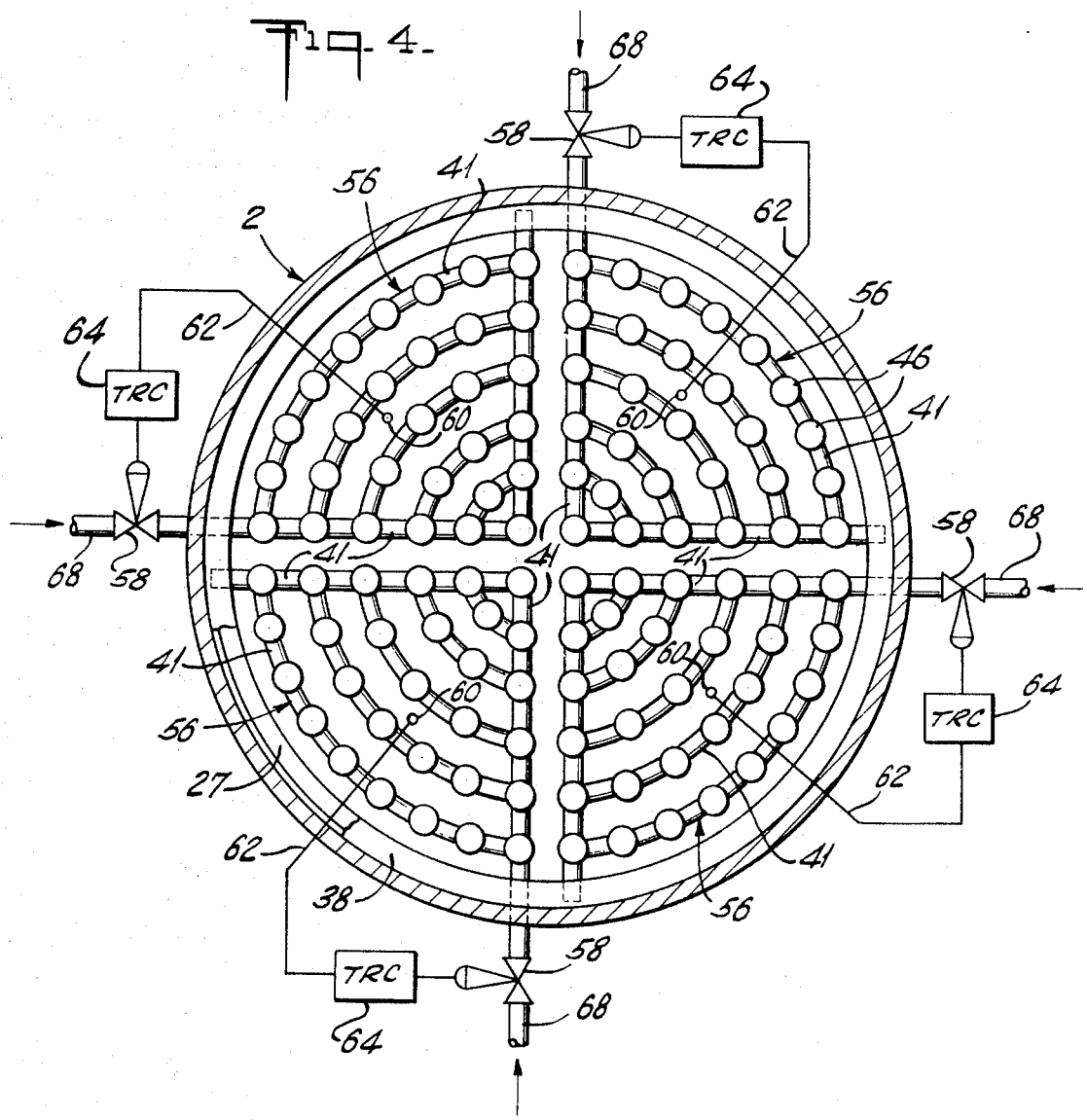

3,591,345
GAS QUENCH DEVICE FOR MIXED-PHASE REACTORS
Jack M. Hochman, Boonton, and Robert M. Koros, Westfield, N.J., assignors to Esso Research and Engineering Company
Filed Nov. 13, 1968, Ser. No. 775,456
Int. Cl. B01j 9/04
U.S. Cl. 23—288                                    1 Claim

ABSTRACT OF THE DISCLOSURE

Apparatus for introducing quench gas to packed-bed reactors, which apparatus is supported within the packed-bed itself. The apparatus comprises a piping arrangement supported within the bed and provided with a number of holes so sized such that the quench gas leaves the apparatus in a uniform manner. Suitable baffle means are provided in communication with each hole to both prevent direct high velocity impingement of the quench gas on the bed and to achieve higher pressure drops so that larger holes may be used, thereby reducing the possibility of plugging. In a preferred embodiment means are also provided for insuring uniformity of bed temperature by the elimination of localized hot spots.

BACKGROUND OF THE INVENTION

This invention relates to the mixing of a gas with material being treated in a packed-bed reactor. In a particular aspect, the invention relates to the mixing of a cooling, or quench gas, with a mixed-phase feed, which feed is to be contacted with a stationary bed (or beds) of particulate contact material in a bed reactor.

The mixing of a quench gas with a mixed-phase feed is encountered, for example, in the hydroprocessing of petroleum fractions. In one such process the particulate bed is composed of catalyst particles such as silica alumina coated with cobalt and molybdenum oxide, and the feed stream includes liquid and vaporized hydrocarbon and hydrogen, which is flowed through the reactor beds at elevated pressures, such as 200–3000 lbs. per square inch and at elevated temperatures such as 350° to 1200° F.

When one considers in particular the process of hydrocracking, which involves exothermic reactions giving off much more heat than other hydrotreating processes since the bulk of the feed rather than a minor constituent is involved, it becomes apparent that some cooling means must be employed. These cooling means, which are essential to product uniformity and catalytic efficiency, must be located in effect throughout the hydrocracking column or tower so as to absorb the excess heat generated by the reaction and thereby control the temperature of the process. Hydrogen is one of the elements of the hydrocracking process and is in current use as a quench gas. Heretofore, it has been introduced between catalytic beds within the hydrocracker to mix with the mixed-phase feed to cool the same before contact with the next catalyst bed.

The main requirements for maximum effectiveness of a quenching device are that it must insure both a rapid and a thorough mixing of the quench gas with the mixed-phase feed. As indicated above, in the past in order to meet these requirements quench devices have introduced the quench gas between each of the catalytic beds in the hydrocracker. It is the purpose of the present invention to provide a method and apparatus to produce a thorough and rapid mixing of the quench gas with the mixed-phase feed, while at the same time effecting substantial savings in hydrocracker reactor heights. When it is realized that reactors of the type herein under discussion may often cost between $20,000 and $30,000 per linear foot of reactor, the magnitude of the savings will be readily apparent. In addition to the reduction in reactor length made possible by the use of the instant invention, the quenching system of the instant invention remains highly efficient over the entire operational range of the reactor. This efficiency and the uniformity in temperature obtained insures higher catalyst activity and prolonged run lengths before shutdown or regeneration.

SUMMARY OF THE INVENTION

In summary, highly uniform quenching is effected by bringing a quench gas into intimate contact with a mixed-phase feed within the individual catalytic beds of a typical fixed-bed hydrocracking reactor. The quenched gas is introduced through a piping arrangement mounted within each bed. The piping arrangement is provided with a number of holes so sized that the quench gas leaves the device uniformly through the various holes. A baffle means is in communication with each hole and serves to prevent high velocity direct impingement of the quench gas on the portions of the bed located in the immediate vicinity of the piping arrangement, which eliminates the chance of cold spots. The lower velocity of the quench gas exiting the baffle plate also results in far better local distribution of the quench gas. The second purpose served by the baffle means is to insure a higher pressure drop over the hole and baffle combination. This allows (for a given pressure drop larger holes to be used in the piping arrangement which thereby reduces the possibility of plugging. The quench gas piping arrangement is suitably supported by support means which are welded to the tops of the individual pipes comprising the arrangement. The support means are in turn affixed to the inner walls of the reactor. A number of preferred embodiments showing possible tubular arrangements for the quench gas pipe arrangement will be discussed hereinafter. Similarly, a number of baffle designs may also be used.

It is therefore an object of the instant invention to provide means and methods for uniformly distributing quench gas in a catalytic downflow reactor.

It is an additional object of the instant invention to provide a novel quench gas distributor having very small height requirements and hence resulting in shorter and less expensive catalytic contacting reactors.

These and other objects as well as a fuller understanding of the invention will be apparent by reference to the following detailed description taken in conjunction with the accompanying drawings wherein:

FIG. 4 is an alternative design for the piping arrangement depicted in FIG. 3.

Figure 1:
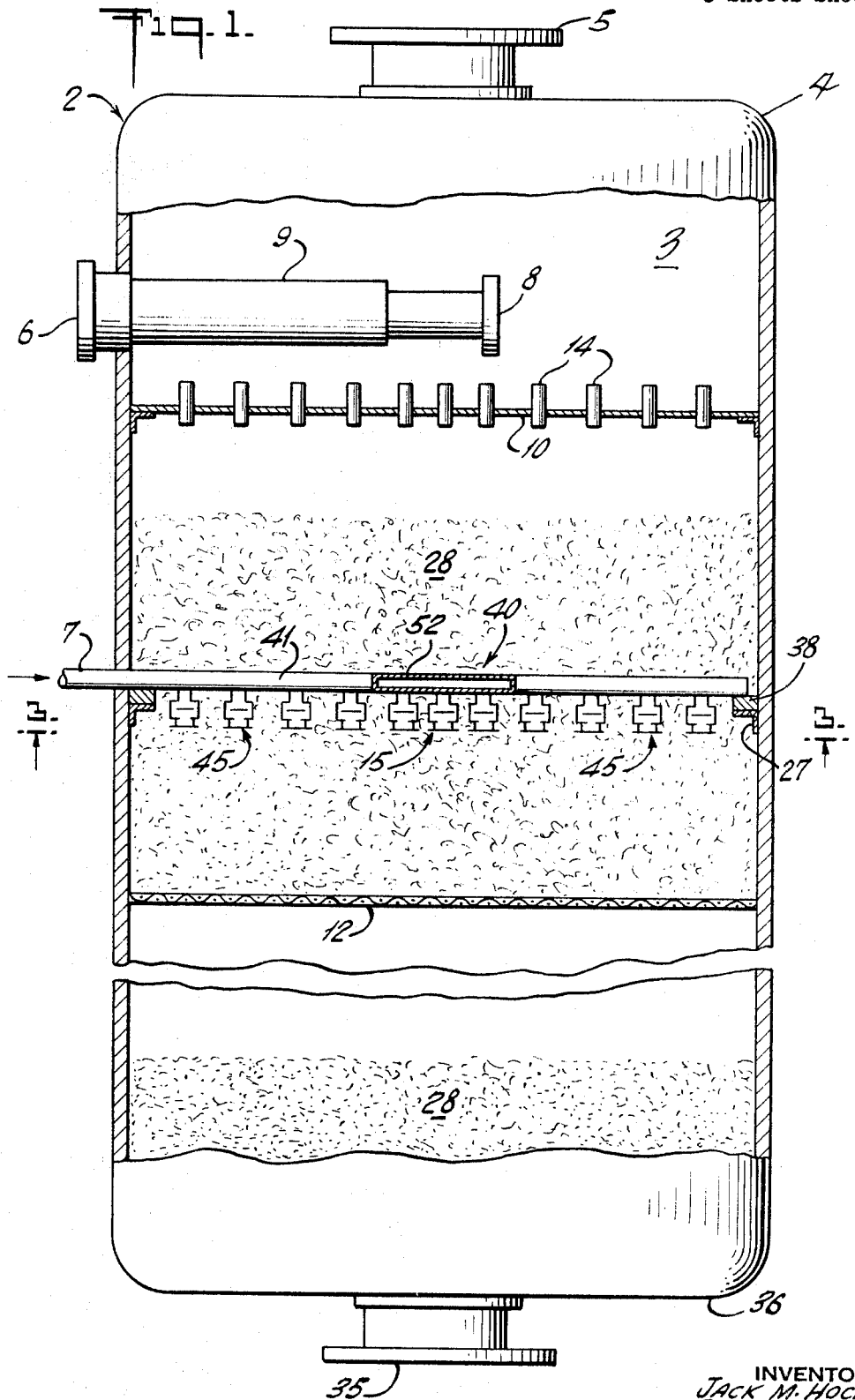
FIG. 1 is a vertical sectional fragmentary view through a hydroprocessing apparatus according to the instant invention.

Referring now more particularly to FIG. 1, the instant apparatus is shown in the environment of a typical catalytic reactor. Thus, reference numeral 2 denotes a cylindrical reactor having a top 4 and a bottom 36. Reactor 2 is usually constructed of corrosion resistant material and is normally insulated (not shown) for operation at elevated temperatures. An outlet conduit 35 is provided in reactor bottom 36 and an inlet flange 5 is provided to allow accessibility to the interior region 3 of the reactor 2. A feed inlet conduit 6 communicates with the interior of reactor 2 through a sparger 9 which is in the form of an open pipe with a splash plate 8 attached at a distance of 2 to 6 inches from the open end of sparger 9.

The foregoing constitutes a description of conventional elements found in many catalytic reactors. According to the instant invention a novel quench gas distribution system is provided in the form of the assemblies (only one of which is shown in FIG. 1) indicated generally by the reference numeral 15. Assembly 15 is comprised of a transversely disposed piping arrangement indicated by reference numeral 40, which in turn is supported within one of the catalytic beds 28 of the reactor by a support member 38. The catalytic bed itself is maintained in a predetermined position within the reactor 2 by means of the mesh support 12 located below assembly 15. Mounting member 38 is securely mounted in a substantially horizontal plane within the reactor 2 in any suitable manner such as by the use of flanges 27. It will be appreciated that any other conventional supports such as channels, angles, brackets, and the like, may be employed to equal advantage. It will also be appreciated that while only two catalytic beds are illustrated, a multiplicity of such beds and a multiplicity of quench gas distributor assemblies 15 may be used in any particular reactor design.

Reactor 2 is also provided with a suitable mixed-feed distribution plate indicated at 10. Plate 10 is provided with a plurality of tubes 14 which insure uniform distribution of the feed entering through sparger 9 over the area of the bed 28. As the feed flows through the upper portion of bed 28, the exothermic hydrocracking reaction referred to hereinabove is initiated. This causes an increase in the temperature of the material flowing through the bed, which also raises the temperature of the bed catalyst itself. It will be appreciated by those skilled in the art that optimum catalyst efficiency is normally obtained within a rather narrow temperature range and that, therefore, an uncontrolled temperature rise in the bed will result in unsatisfactory product quality and low catalyst efficiency. By locating the quenching apparatus within the catalytic bed, as disclosed in the instant invention, control of the catalytic temperature is more readily achieved than with those quench devices heretofore available. This results in higher catalytic activity and efficiency, while at the same time insuring uniformity in the products produced due to the avoidance of wide temperature differentials within the bed.

As the feed percolates through the upper region of bed 28, its temperature gradually increases. At a predetermined level within the bed it then comes into contact with the quenching apparatus 15. A suitable quench gas such as hydrogen is introduced to the apparatus through the conduit 7 and then flows through the piping arrangement 40 of the quench device 15. A multiplicity of holes 16 are provided within piping 40 so that the quench gas may be evenly distributed within the bed. Thus, the quench gas is uniformly distributed within the bed in the proximity of the quenching apparatus and it intimately contacts the mixed feed which is percolating through the bed. 28. The percolating mixed feed is consequently quenched by the cool hydrogen quench gas supplied through conduit 7.

Figure 2:
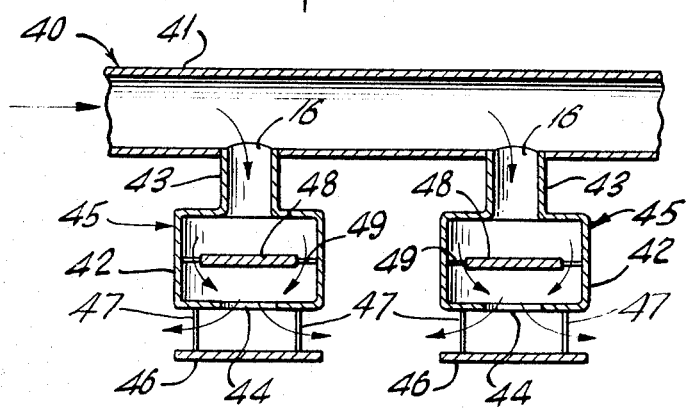
FIG. 2 is an enlarged detailed sectional view of a portion of the quenching device of the instant invention.

An enlarged sectional view of a portion of the quenching apparatus of the instant invention is shown in FIG. 2. As illustrated therein, each of the holes 16 is provided with a baffle structure indicated generally at 45. Structure 45 is comprised of a box-like portion 42, whose interior is in communication with the hole 16 through the connecting conduit 43. A first baffle plate 48 is provided within box member 42 and is maintained therein in spaced relation by means of spider supports 49. Box member 42 is provided with an exit hole 44 under which is positioned a second baffle plate 46. Baffle plate 46 is supported from box member 42 by means of supports 47. The flow of gas from the piping arrangement 40 of the quench device through the baffle structures 45 is indicated generally by the phantom arrows in FIG. 2.

The function of baffle structures 45 is twofold. First, they prevent the direct high velocity impingement of the quench gas onto the particles comprising the bed 28. This eliminates the chance of temperature maldistributions within the bed due to localized cold spots. The second major function of the baffle structures 45 is that since the quench gas now has to impinge on the plates 48 and 46, it must change direction. This impingement and subsequent change in direction causes the pressure drop across the hole 16 in combination with the baffle structure 45 to be substantially increased. This increase in the pressure drop, which is necessary to insure uniform distribution through the plurality of holes 16 within piping arrangement 40, is thus achieved without going to smaller holes, thereby greatly reducing the possibility of plugging. It will be appreciated by those skilled in the art that other baffle designs may be employed to advantage in the instant invention and that the preferred embodiment depicted in FIG. 2 is for purposes of illustration only. Thus, if desired, a single baffle plate could be provided and positioned in a manner similar to that used to attach baffle plate 46.

Figure 3:
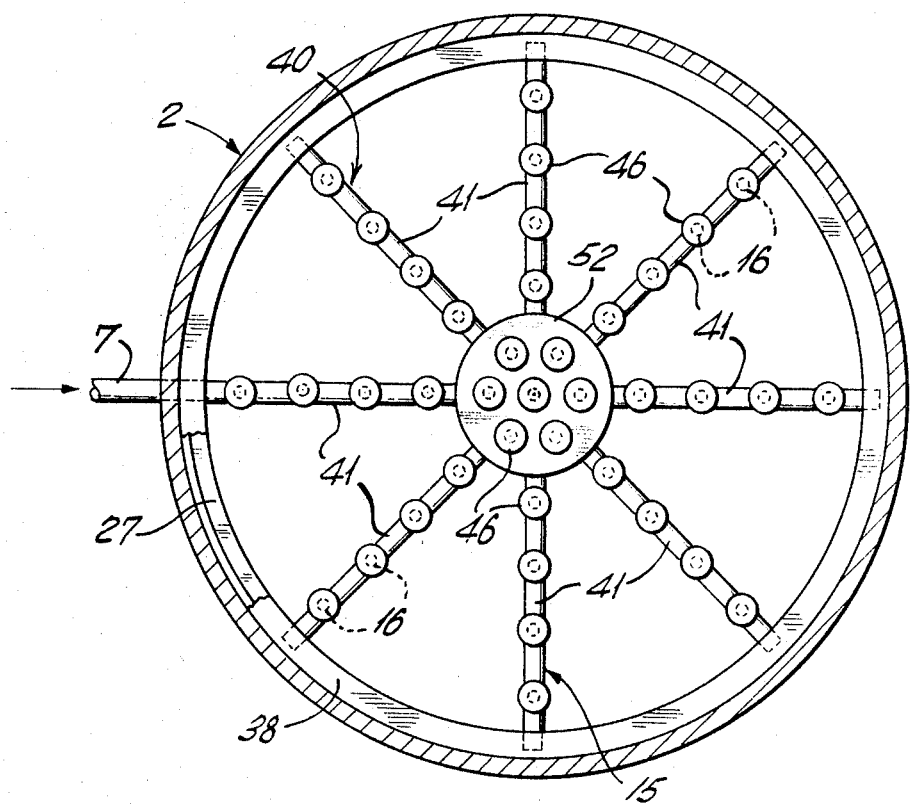
FIG. 3 is a transverse section taken along the line 3—3 of FIG. 1.

Turning now to FIG. 3, a bottom plan view of one embodiment of the quench gas piping arrangement 15 taken along the line 3—3 of FIG. 1 is therein presented. As may be seen, piping arrangement 15 is comprised of a plurality of radial tubes 41 which emanate from a central hub-like portion 52. A plurality of holes 16 is provided within each of the radial tubes 41 and within hub region 52 to insure that the quench gas flowing into the piping arrangement 15 through the conduit 7 is uniformly distributed throughout the catalytic bed (not shown in FIG. 3) located above and below piping arrangement 15. A suitable support 38 is provided for maintaining piping arrangement 15 in a substantially horizontal position within column 2. As hereinbefore indicated, support 38 may be attached to the inner walls of column 2 through the use of any suitable flange means. As also previously discussed, each of the holes 16 is in communication with suitable baffle means to further enhance uniform distribution and to insure that holes of sufficient size to avoid plugging may be utilized as hereinbefore explained. While the holes 16 and their associated baffle means (not shown in FIG. 3) have been illustrated as being provided only on the bottom portion of piping arrangement 15, it is to be appreciated that if desired an additional plurality of holes and baffle means could be positioned on the upper portion of piping arrangement 15.

An alternative embodiment of the piping arrangement 15 is depicted in FIG. 4. As illustrated therein, the piping arrangement is segmented into four independent portions, each identified by the reference numeral 56 and each fed by an independent source of quench gas through the conduits identified by the reference numerals 68. Within the portion of the bed below each of the segments 56, there is provided one or more suitable thermocouples 60 which ascertain the temperature of the bed in the region of that particular segment. Thermocouples 60 send signals proportional to the temperatures sensed via the signal lines 62 to temperature remote controllers 64. These controllers in turn serve to actuate the flow control valves 58 which vary the amount of quench gas delivered to each of the particular segments 56. The particular arrangement in FIG. 4 insures greater uniformity of temperature throughout the bed since any localized hot spots which develop will be immediately returned to the desired temperature by the admission of additional amounts of quench gas.

In the preferred embodiment of the apparatus shown in FIG. 3, each of the holes 16 has a diameter in the range of from about ½ inch to about 2 inches and preferably about 1 inch. The interhole spacing is in the range of from about 3 to about 15 inches and preferably about 12 inches. The internal diameter of each of the radial tubes 41 is in the range of from about 1 inch to about 4 inches.

As an example of the effectiveness of the instant invention, an overall reduction in reactor height of 20% may be realized by its utilization in a typical hydrocracking reactor designed to process about 20,000 barrels per day. In the alternative without changing reactor height, the volume of catalyst per existing reactor can be increased by 33%, thereby increasing run length and decreasing reactor downtime due to catalytic exhaustion.

While the instant invention has been described in considerable detail by way of discussion and illustration, it is to be appreciated that obviously certain changes and modifications may be made without departing from the spirit of the invention. Therefore, in determining the full scope of the invention, reference should be had to the following claim.

What is claimed is:

1. In a packed bed reactor of the type having at least one packed bed provided with a quench gas introduction device in the form of a tubular distributor located within said packed bed and having a multiplicity of holes positioned therein to distribute said quench gas, wherein the improvement comprises baffle means operatively associated with each of said holes, said baffle means comprising a hollow body portion with an inlet end and an outlet end, said inlet end being in communication with one of the holes in said multiplicity, a first baffle plate maintained in spaced relation within said body portion between said inlet end and said outlet end and a second baffle plate positioned without said body portion adjacent to said outlet end whereby quench gas exiting from said outlet end impinges on said second baffle plate.

References Cited
UNITED STATES PATENTS

| | | | |
|---|---|---|---|
| 2,330,767 | 9/1943 | Welty | 23—288X |
| 2,461,331 | 2/1949 | Leesemann | 23—288X |
| 2,632,692 | 3/1953 | Korin et al. | 23—288 |
| 2,664,347 | 12/1953 | Rehrig | 23—288 |
| 2,892,002 | 6/1959 | Summers | 23—288X |
| 3,163,498 | 12/1964 | Lisankie et al. | 23—288 |
| 3,208,833 | 9/1965 | Carson | 23—288 |
| 3,378,349 | 4/1968 | Shirk | 23—288 |
| 3,455,658 | 7/1969 | Wilkinson | 23—288X |
| 3,492,099 | 1/1970 | Sze | 23—288X |

MORRIS O. WOLK, Primary Examiner

B. S. RICHMAN, Assistant Examiner

U.S. Cl. X.R.

23—284; 261—96